Sept. 8, 1964 R. A. MALERBI 3,148,330
SELF-POWERED RADIO TRANSMITTER FOR USE WITH FLASH PHOTOGRAPHY
Filed June 20, 1962 2 Sheets-Sheet 1

INVENTOR.
Robert A. Malerbi
BY
Brown and Mikulka
ATTORNEYS

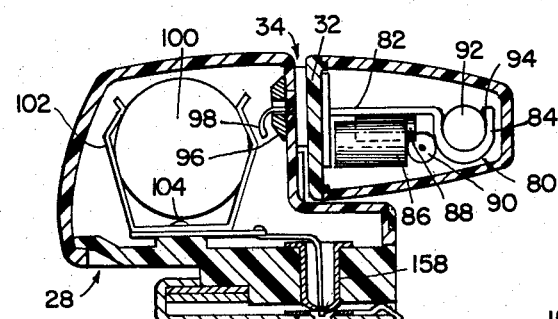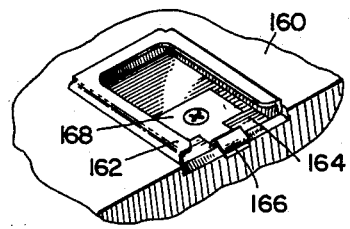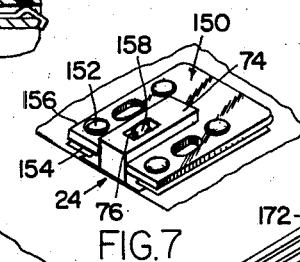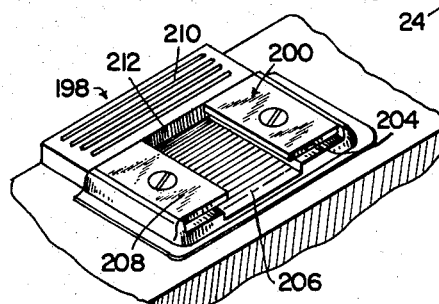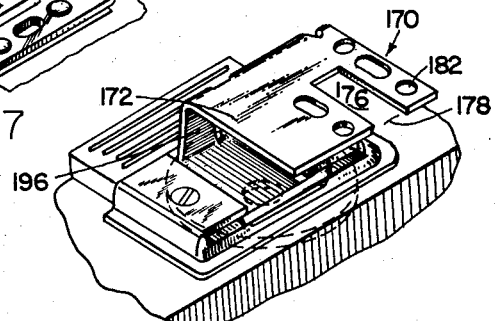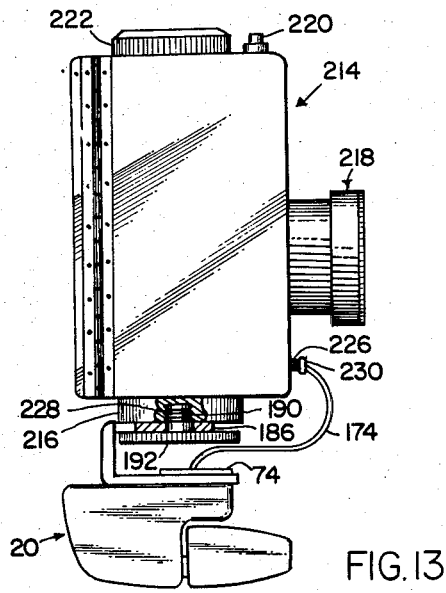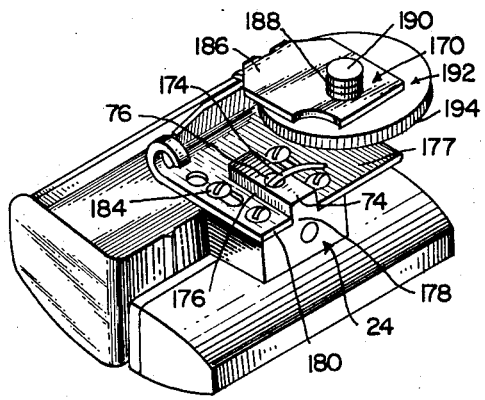

United States Patent Office 3,148,330
Patented Sept. 8, 1964

1

3,148,330
SELF-POWERED RADIO TRANSMITTER FOR USE
WITH FLASH PHOTOGRAPHY
Robert A. Malerbi, Brighton, Mass., assignor to Polaroid
Corporation, Cambridge, Mass., a corporation of
Delaware
Filed June 20, 1962, Ser. No. 203,812
10 Claims. (Cl. 325—102)

The present invention relates to flash photography and more particularly to a self-powered radio transmitter which is mounted on a camera and actuates remote flash means when said camera is operated.

It is a primary object of the present invention to provide a self-contained device which is essentially a two-part device comprising a transmitter housing and a battery housing connected thereto.

It is a further object of the present invention to provide in such a device provisions for mounting a plurality of connector types which allow the device to be mounted in a plurality of different types of cameras.

It is a further object of the present invention to provide such a device which may be mounted in a camera flash mount or a camera tripod mount by selection of the proper connector, and has a means such that the device is actuated in response to actuation of the camera shutter.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 7 is a fragmentary bottom view showing one type of connector mounted on the shoe section of the present invention;

FIG. 8 is a perspective view of a camera flash mount with which the connector of FIG. 7 is used;

FIG. 9 is an interior side view of the present invention mounted in a connector similar to that of FIG. 8;

FIG. 10 is a perspective bottom view of the device of the present invention illustrating a second type of connector which may be used;

FIG. 11 is a perspective view of a camera flash mount with which the connector of FIG. 10 is used;

FIG. 12 is a perspective front view illustrating the connector of FIG. 10 mounted in the flash mount of FIG. 11; and FIG. 13 is a side partially cutaway view of the present invention mounted in a camera tripod mount.

Present photographic techniques often require the use of an auxiliary lighting source which may be placed proximate to but not connected to a camera which is used to photograph an illuminated subject. The device of the present invention provides a compact self-powered actuation means which may be mounted on several different types of cameras. In a preferred use, the device upon operation of the camera transmits an actuation signal to a remote flash means such that a high intensity artificial light is provided synchronously with operation of the camera. The device of the present invention is normally mounted in a camera flash mounting; however, in order that it may be used with a wide range of cameras, provisions have been made such that the device may also be mounted in a camera tripod mount with an electrical connection to flash actuating means being made by means of a wire passing from the device to the camera flash actuating means.

Figure 1:
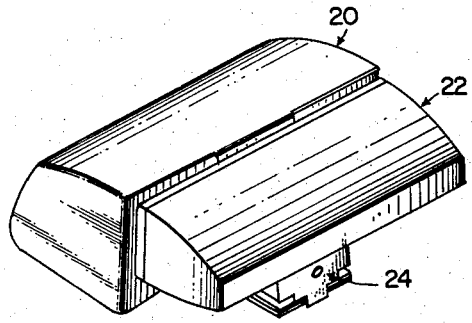
FIGURE 1 is a perspective frontal view of the device of the present invention.
Figure 5:
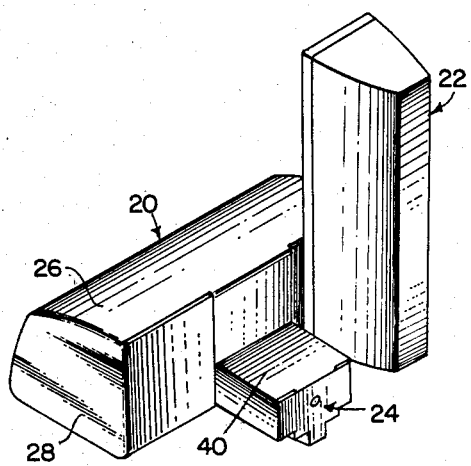
FIG. 5 is a perspective front view of the present invention illustrating the transmitter housing in a raised position to permit access to said battery housing.

Referrnig now to the drawings, FIGURES 1 and 5 illustrate different views of the device. In operation, the device is in the position shown in FIGURE 1 wherein a main battery housing 20 has a transmitter housing 22 across the front surface thereof. This transmitter housing rests upon a shoe section 24 on which is mounted the particular type of connector to be used. The battery housing 20 contains electrical connections to actuate the device and also a removable battery. Access means are provided to battery housing 20 by swinging transmitter housing 22 in an arc of substantially 90° such that a battery cover portion 26 may be removed from its mating relationship with a battery base portion 28 to allow access therein.

Figure 2:
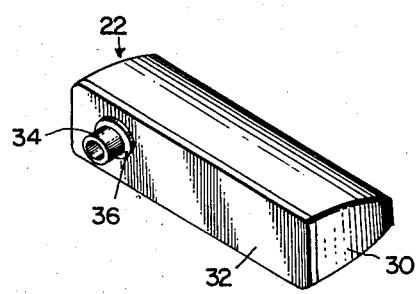
FIG. 2 is a perspective bottom view of a transmitter housing used in the present invention.

The transmitter housing of the present invention is shown in FIG. 2. Housing 22 comprises a cover portion 30 and a base portion 32. The cover portion is preferably sealed to the base portion, however, it may be designed such that they are pressure fed together. Base portion 32 has a cylindrical section 34 centrally located at one end thereof. Section 34 is hollow and has a larger section 36 at the base of the cylinder. Section 36 is used to facilitate mounting of the transmitter housing upon the battery housing and to maintain a gap between said housings to permit rotation of transmitter housing 22 about battery housing 20.

Figure 4:
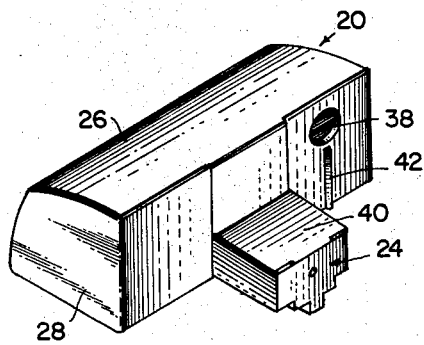
FIG. 4 is a perspective front view of the battery housing of FIG. 3 with the parts thereof in a closed position.

The major parts of the battery housing 20 are shown in FIG. 4. The battery housing has a cover portion 26 which fits upon a base section 28. The base section has a shoe section 24 extending outwardly therefrom. The transmitter housing is connected to the battery housing through hole 38 in the front surface of battery base portion 28. As shown in FIGURE 1, the transmitter housing normally is pivoted about hole 38 such that it rests upon flat surface 40 formed by the extension of the shoe section from the side of the battery housing. Directly beneath hole 38, there is a molded ridge 42 which is perpendicular to the bottom of base portion 28. The transmitter housing is pivoted upwards as shown in FIG. 5 to permit access to the inside of the battery housing 20. Ridge 42 acts to frictionally position the housing in such a vertical position. When in this position, transmitter housing 22 also rests against a side surface of shoe section 24 to restrict movement of the transmitter housing to the substantially vertical position shown.

Figure 3:
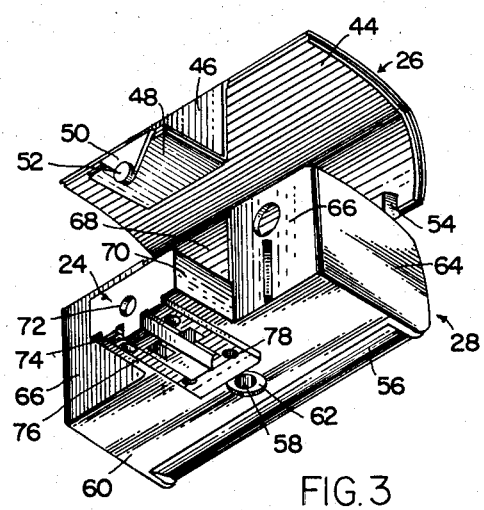
FIG. 3 is a perspective bottom view of a battery housing used in the present invention with the parts thereof separated to illustrate their relative configurations.

The parts of the battery housing comprising a cover portion 26 and a base portion 28 are shown in greater detail in FIG. 3. Cover portion 26 has a curved section 44 which acts as a cover for base portion 28. A section 46 of cover portion 44 is centrally located on the front thereof and extends substantially vertically downward therefrom. This section has a vertical bend in the lower portion thereof such that it provides a cover for an open shoe section 24 which is a part of base portion 28. The lower part 48 of section 46 has a tab 50 on the front thereof. Tab 50 is substantially at a right angle to part 48 and has a pin 52 protruding therefrom. This pin serves as one means of fastening cover portion 26 to base portion 28. The portion is also fastened to the rear of the base portion by means of a lip 54 molded on the bottom rear of cover portion 26 which is designed to fit into a corresponding indentation 56 contained in the bottom rear of base portion 28. Base portion 28 contains a means for mounting a battery which is shown in greater detail in FIG. 9. This mounting means is secured to the base portion by means of a fastening device which passes through a hole 58 in the bottom surface 60 of base portion 28. This hole has a depressed portion 62 molded around the hole such that the head of a fastening device may be placed therein such that it does not extend above the bottom surface of the device. Base portion 28 has side walls 64 and a front wall 66 such that it essentially forms a box-like structure with an open top and rear surface. The front surface 66 has an opening 68 in the middle thereof from the base of which a shoe section 24 extends vertically outward. The shoe section has low walls 70 around the top surface thereof, these walls being joined to the front wall 66 of the base section. The front of shoe section 24 contains a hole 72 behind which tab section 50 of cover portion 26 is inserted such that pin 52 fits within hole 72 to hold the cover portion in place on top of the base portion, cover portion 26 thus fitting around thereupon the base section to completely enclose it.

Shoe section 24 has a raised rectangular molded portion 74 on the base thereof. Portion 74 has a hole 76 approximately in the middle thereof.

Shoe section 24 has holes 78 positioned around raised portion 74 which provide a means to fasten a connector to the said shoe section.

FIG. 9 is an interior side view of the present invention illustrating the arrangement and relative location of the parts contained therein. The transmitter housing 22, comprising a cover portion and a base portion, has a means for mounting transmitting means which generate an actuation signal to activate a remote flash means. The transmitting means comprises an electronic oscillator and a radiating inductive tuner which will be more fully described below. The mounting means comprises a molded member 80. This member has a lower flat surface 82 and an upper semicylindrical section 84. The base of the lower flat surface is secured to base portion 32 of the transmitter housing by appropriate fastening means through right angle feet located at the base of the mounting board. Appropriate fastening means are preferably fastening pins molded in base portion 32 of the transmitter housing, although mounting means 80 could be secured thereto by an adhesive such as a plastic glue. The mounting member contains circuit components as for example, transistors 86, resistors 88 and capacitors 90 which are mounted along one side of the lower flat surface 82 thereof. By mounting all components on one side of the board the leads from these components may be extended through holes on the mounting board to permit all soldering connections to be made on the other side thereof. A ferrite core 92 is mounted in semicylindrical section 84 of the mounting member, preferably being secured therein by a potting compound 94 along the edges thereof. Cylinder section 34 which extends from the transmitter housing through and into the battery housing is secured inside said battery housing by appropriate means 96 such as a lock washer which permits the transmitter housing to rotate with respect to said battery housing while still being securely fastened to base portion 28 of the battery housing. Wire 98 provides a means of electrical connections between the transmitter housing and the battery housing. The battery housing contains a battery 100 mounted in a suitable clip 102 secured to the base thereof by fastening means 104. As shown in this illustration the device has a mounting connector similar to that shown in FIG. 7 and is mounted within a flash mount receptacle such as that shown in FIG. 8.

Figure 6:
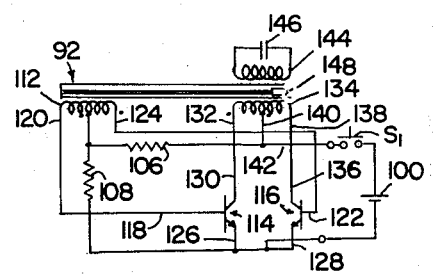
FIG. 6 is a schematic diagram of a preferred electronics transmitter circuit of the present invention.

The electronic schematic of the circuit of the present invention is illustrated in FIG. 6. A switch S1 provides an actuation means to turn on a circuit. Switch S1 represents the signal flash-synchronization contacts forming a part of the camera shutter and is actuated by depression of shutter button 220, shown in FIG. 13, which also operates the camera shutter mechanism. When this switch is closed, battery 100 is connected into the circuit through a voltage divider comprising resistors 106 and 108. These resistors form a voltage divider which acts to bias the transistors of the circuit into conduction so that the oscillator of the circuit will start. A tap 110 to inductance 112 is connected between the resistors of the voltage divider. The other end of the battery 100 is connected to a common point. The circuit has two transistors 114 and 116 contained therein. Base 118 of transistor 114 is connected to one end 120 of inductance 112. Base 122 of transistor 116 is connected to the other end 124 of inductance 112. The transistor emitters 126 and 128 are connected to a common point. The output of transistor 114 at collector 130 is connected to one end 132 of inductance 134. The output of the second transistor 116 at collector 136 is connected to the other end 138 of inductance 134. Inductance 134 has a tap 140 thereon which is connected to line 142. Inductance 134 may be considered a primary winding about core 92 with a secondary winding or inductance 144 also being wound thereupon. Inductance 144 has a capacitor 146 connected thereacross. The value of this capacitor is selected for the particular frequency which it is desired to have the transmitter emit. The frequency in this case is approximately equal to the formula:

$$f = \frac{1}{2\pi\sqrt{LC}}$$

Core 92 is of a common ferrite type and has a slug 148 which is adjustable therein.

The circuit is similar to that of a push pull amplifier in that transistors 114 and 116 are alternately conducting. Although the present circuit uses two transistors to increase the output efficiency, it should be understood that a circuit using only one transistor might also be used. When switch S1 is closed current flows through the voltage divider and the center tap of inductance 112. When the bases 118 and 122 of transistors 114 and 116 respectively are alternatively positively biased the particular transistor becomes operative. Inductance 134 is tapped at point 140 and connected back into line 142 feeding the voltage dividers and inductance 112. A regenerative or feedback path is thus set up causing the circuit to oscillate.

The signal in the primary winding (inductance 134) introduces a voltage into the secondary winding (inductance 144) of the core 92. Inductance 144 is adjusted to the exact resonance frequency desired by varying the position of the slug 148 within the core 92.

FIG. 7 illustrates one type of a connector which may be used with the device of the present invention when the device is mounted within a camera flash mount such as that shown in FIG. 8 which provides a flash actuation means controlled by operation of the camera. The connector 150 is a metallic U-shaped member, the arms of which fit about raised rectangular portion 74 of shoe section 24. The connector is fastened to the shoe section by means of appropriate fastening devices 152 which pass into mounting holes 78 molded in the shoe section. When the connector 150 is mounted on the shoe section 24 conductive strips 154 are inserted beneath each arm 156 of the connector. These strips establish one electrical contact with a camera flash actuating means. As illustrated in FIG. 9 and shown as well in FIG. 7, there is a spring loaded pin 158 which extends through hole 76 in the center of raised portion 74 of the shoe section to establish a second electrical contact with the said camera flash actuating means. The camera flash mount of FIG. 8 is located on a surface 160 of a camera and consists of metal side walls which are bent at the tops thereof to form a flat right angle portion 162. The front end 164 of this semi-enclosure is open to allow insertion of a connector of the type described in FIG. 7. Spring 166 is centrally located in this opening and is depressed to insert a flash mechanism or a device such as that of the present invention. When inserted, the spring exerts a force to hold the said mechanism in place. A metallic portion 168 provides a second electrical contact within the flash mount along with the side walls 162 of this type of mount. In operation, the device mounted on the connector of FIG. 7 is slid into flash mount of FIG. 8 such that conductor strips 154 secured beneath the arms 156 of connector 150 engage the side members 162 of the flash mount to establish one electrical connection. The spring loaded pin 158 which extends through the shoe section of the battery housing base establishes a second electrical contact with flash mount portion 168 as shown in FIG. 9.

Referring now to FIG. 10 and FIG. 12, there is shown a bottom front perspective view of the device of the present invention with a second type of connector mounted thereon. Connector 170 is a U-shaped member with a first arm 172 thereof connected to shoe section 24. The shoe section has a central raised rectangular portion 74 with a hole 76 in the middle thereof. Provisions are made for connecting the device to actuating means located on said camera by means of a wire 174. Arm 172 of connector 170 has a slot 176 on one side thereof. This slot is rectangular with an open end 178 on the front edge 180 thereof. The arm has mounting holes 182 on the sides of slot 176. When mounted, slot 176 fits around raised rectangular portion 74 of shoe section 24, mounting holes 182 matching holes in the shoe section. A fastening means 184 such as screws or rivets are used to connect arm 172 to shoe section 24.

The second arm 186 of bracket 170 has a threaded hole 188 on the side of bracket 170 which is opposite to the location of slot 176. There is mounted in this hole 188 a screw 190 which has a flat head 192 of substantial diameter with knurled edges 194 thereon. This screw is threaded through hole 188 and used as a method of securing arm 186 and therefore the device of the present invention to a camera. Arm 186 is substantially rectangular in shape with the rear edges thereof converging at the rear thereof to a base portion 196 of said bracket. This base portion joins arms 172 and 186 at the rear of the arms. The base portion is cut away such that arm 186 may be inserted within a camera flash mount connector. Arm 186 is of a substantially narrower width than arm 172. Bracket 170 is preferably constructed from a metallic material; however, any material which would give sufficient rigidity and could be tapped for screw member 190 may be used.

FIG. 11 is a typical flash mount connector comprising a part of a camera wherein the flash actuating means is located elsewhere on the body of said camera. The flash mount connector in this case serves only as a mechanical structure for securely mounting a device upon said camera. The flash mount connector 198 has two sides 200 thereof which are slotted in a plane horizontal to the surface of the camera. These slots 204 are raised a finite distance above the bed 206 of said flash mount. The upper arms 208 of said slots extend beyond the lower surfaces of said slots and act to hold the device being mounted within connector 198. There is provided a rigid structure 210 having a flat vertical surface 212 at the rear of said connector mount. This surface 212 acts to hold a device mounting means within said connector such that the device may be secured therein.

FIG. 12 illustrates the connector of FIG. 11 with a mounting bracket of the type described above in FIG. 10 mounted therein. In this representation, the device of the present invention has been removed from arm 186 of bracket 170 to permit a clearer observation of the method of mounting bracket 170 to connector 198. As can be seen from the drawing, arm 186 of connector 170 is slid within slots 204 and positioned within connector 198 by base portion 196 of said bracket which rests against surface 212 of rigid member 210. As described above, the bracket while positioned within the connector is not securely held therein. Screw member 190 provides a means of securing the bracket within the connector. By turning the head 192 of screw 190, arm 186 may be wedged securely against the top arms 208 of slot 204. Screw 190 resting against the bed 206 of the connector provides a lifting force against the threaded portion of arm 186.

FIG. 13 represents the device of the present invention mounted to a camera represented as 214 within the tripod mount 216 of said camera. Camera 214 has a shutter means 218, an actuation means 220, a means 222 for advancing a film within said camera, a rear access means 224 to said camera, a flash connector 226, and a tripod mount 216 on the base thereof. In this illustration tripod mount 216 is an extended portion located on the base of camera 214. The tripod mount has a threaded hole 228 therein. A second arm 186 of bracket 170 has a screw 190 mounted therein. Screw 190 has a flat head 192 of substantial diameter with a knurled edge thereon. To secure the device to the camera, screw 190 is inserted in threaded hole 228 and secured therein by rotation of the screw. Head 192 acts to securely hold bracket arm 186 and therefore the device against tripod mount 216 when the screw is tightened therein.

The base section of battery housing 20 has a wire 174 extending through raised rectangular portion 74 and connecting the device of the invention to a flash actuating means of camera 214. Wire 174 has a connector 230 located on the outer end thereof. This connector fits about a mating connector 226 which is the camera means for actuating a flash device. In operation, when button 229 is depressed, shutter means 218 is actuated which then actuates a camera flash means causing an actuation signal to be passed from connector 230 through wire 174 into the device of the present invention. The device is thus operated synchronously with operation of the camera.

The device of the present invention thus provides a compact self-powered transmitter which is designed to mount within and be secured to a camera flash holding means or alternatively may be mounted and secured to a camera within the camera tripod mount. The device is designed to be actuated by electrical contacts within the camera flash holding means which are actuated by operation of the camera. In those cases where a flash holding means is either not available or not electrically connected to the camera shutter means, the present device provides for a connection such as a wire which has a connector on the outer end thereof. This connector fits about a mating flash output connector contained on the body of such cameras.

Since certain changes may be made in the foregoing device without departing from the scope of the invention herein involved, it is intended that all matter contained in the above description or shown in the accompanying drawings shall be interpreted as illustrative and not in a limiting sense.

What is claimed is:

1. A self-powered radio transmitter device to actuate remote flash means used with a photographic camera having a shutter means and a flash actuation means actuated thereby comprising, in combination:

a battery housing;

a transmitter housing connected to said battery housing, said transmitter housing including a base and a cover portion, said transmitter housing containing means for mounting an electronic oscillator and a radiating inductive tuner, said last-mentioned means being a mounting board with a lower flat portion and an upper semicylindrical portion, said latter portion having the long axis of the semicylinder along one edge of said lower portion, the other edge of said lower portion being secured to the base portion of said transmitter housing; and mounting means for mounting said device on said camera, said mounting means being located on the base of said battery housing.

2. A self-powered radio transmitter device to actuate remote flash means used with a photographic camera having a shutter means and a flash actuation means actuated thereby comprising, in combination:

a battery housing consisting of a cover and a base portion;

a transmitter housing pivotally connected to said battery housing, said transmitter housing having a cover and a base portion, said base portion having a cylindrical section molded therein, said cylindrical section being centrally located at one end of said base portion, said cylindrical section extending into the base portion of said battery housing through a matching size hole therein when said base portions are in juxtaposition, said cylindrical section being secured within said housing base portion by a locking member, said locking member grasping said cylindrical section to prevent its withdrawal, said locking member allowing said cylindrical section to rotate within said hole, said transmitter being electrically connected to said battery and an actuating means by means of a wire passing through said cylindrical section; and mounting means for mounting said device on said camera, said mounting means being located on the base portion of said battery housing.

3. A self-powered radio transmitter device to actuate remote flash means used with a photographic camera having a shutter means and a flash actuation means actuated thereby comprising, in combination:

a battery housing, said housing having a cover and a base portion, said portions being constructed of a molded material, said base portion having a clip mounted therein to hold a battery, said base portion having a main section holding said battery and a shoe section extending outwardly from said battery section, said shoe section being centrally located on the lower middle surface of one side of said battery section, said shoe section extending outward vertically therefrom, said shoe section having a bottom surface molded to receive an appropriate connector for mounting said device on said camera, said shoe section having means therein for providing electrical contacts between said transmitter device and said camera flash mechanism, said shoe section having means therein for mounting said connector thereon; and a transmitter housing pivotally connected to the base portion of said battery housing.

4. A self-powered radio transmitter device to actuate remote flash means used with a photographic camera having a shutter means and a flash actuation means actuated thereby comprising, in combination:

a battery housing, said housing having a cover and a base portion;

said base portion being of a molded material, said base portion comprising a lower surface on which a battery clip is mounted, two side surfaces, and a front surface, said surfaces thereby forming a box structure with an open top and rear surface, said front surface having an opening therein, a shoe section of said base portion extending outwardly from said opening, said shoe section having low walls around the sides thereof, said walls being connected to said front surface, said shoe section having holes therein, said transmitter device being wired through said holes to actuating means, said shoe section having a connector mounted on the bottom thereof for mounting said device on said camera;

said cover portion of said battery housing being of a molded material, said cover having a top surface, a rear surface at substantially right angles to said top surface and a partial front surface having a right angle bend therein, said rear surface having a lip extending inwardly along the lower edge thereof, said lip fitting into a corresponding indentation in the lower surface of said base portion when said cover portion is mounted thereon, said bent partial front surface fitting into the opening of said base front surface on said top of said shoe section, thereby covering contact wires connected therein, said bent partial front surface having a tab section at right angles to the end of said surface covering said shoe section, said tab having a molded tip on the outer surface thereof, said base shoe section having an indentation molded in the front thereof, said tip fitting into said indentation to hold said cover portion against said base portion; and a transmitter housing pivotally connected through the front surface of said battery housing.

5. A self-powered radio transmitter device to actuate remote flash means used with a photographic camera having a shutter means and flash actuation means actuated thereby comprising, in combination:

a battery housing, said housing having a cover and a base portion constructed of a molded material, said base portion having a shoe section extending outwardly from the lower front thereof, said base portion having a front surface containing a mounting hole, a ridge on said front surface beneath said hole and substantially perpendicular to the lower edge of said front surface;

a transmitter housing, said housing having a cover and a base portion constructed of a molded material, said cover portion being secured to said base at the edges thereof, said base portion having a cylindrical section extending outwardly therefrom at one end thereof, said cylindrical section extending through said hole into said battery housing when said transmitter housing and said battery housing are juxtaposed, said cylinder being secured within said battery housing, said transmitter housing thereby being pivotally mounted about said battery base portion, said transmitter housing resting in a horizontal position on said extended shoe section during operation of said device, said transmitter housing pivoting substantially vertically to permit removal of said battery housing cover portion for access to a battery normally contained within said battery housing, said transmitter housing being held in said vertical position by pressure of said ridge against the base of said transmitter housing and the location of a portion of said transmitter housing in close proximity to the side of said shoe section; and mounting means for mounting said device on said camera, said mounting means being located on the base portion of said battery housing.

6. A self-powered radio transmitter device to actuate remote flash means adapted for use with a photographic camera having a shutter means, flash actuation means actuated by said shutter means, and a mounting connector for a flash mechanism, said connector having the upper sides thereof bent inwardly at a right angle, comprising, in combination:

a battery housing having a cover and a base portion constructed of a molded material, said base portion having a shoe section thereon, said shoe section having mounting holes positioned around a raised portion thereof;

a U-shaped flat metallic connector positioned on said shoe section around said raised portion, said connector being fastened to said shoe section by fastening means fitting said mounting holes in said shoe section, said connector overlapping said shoe section on the sides thereof, said connector fiting said camera flash mechanism mounting connector, the sides of said camera connector fitting between said U-shaped connector and the base portion of said battery housing to hold said device on said camera; and a transmitter housing pivotally mounted about a hole in the side of said battery housing, said transmitter housing containing means for mounting a signal generating means, said transmitter housing being electrically connected to said battery housing by means of a wire passing through said hole.

7. A self-powered radio transmitter device to actuate remote flash means adapted for use with a photographic camera having a shutter means, flash actuation means actuated thereby, and mounting means for a flash mechanism comprising, in combination:

a battery housing having a cover and a base portion, said base portion containing a battery mounted therein, said base portion having a shoe section thereon, said shoe section having holes therein through which said device is electrically connected to an actuating means, said shoe section having a U-shaped connector mounted thereon, said connector fitting within said flash mounting means on said camera:

said shoe section having a conductive metallic strip mounted between said connector and said shoe section beneath the arms of said connector, said shoe section having a spring loaded pin extending from within said base section through the center thereof, said conductive strips and said pin being electrically connected to said device within said battery housing, said conductive strips and said pin engaging corresponding electrical contacts when said device is fitted on said flash mounting means of said camera, operation of said shutter means actuating said flash mounting means electrical contacts to cause operation of said device; and a transmitter housing pivotally mounted on said battery housing by means of a hollow cylinder on said transmitter housing base, said cylinder being secured within said battery housing, said transmitter housing containing means for transmitting an actuating signal to said remote flash means, said transmitter means being connected to said battery and said actuating means by a wire passing through said hollow cylinder and connected within said battery housing.

8. A self-powered radio transmitter device to actuate remote flash means adapted for use with a photographic camera having a shutter means, flash actuation means actuated by said shutter means, and a mounting connector for a flash mechanism, said connector having the inner side surfaces thereof slotted to receive a mating connector comprising, in combination:

a battery housing having a base and a cover portion constructed of a molded material, said base portion having a shoe section thereon, said shoe section providing mounting means for a connector;

a connector for mounting said device on said camera, said connector being a U-shaped bracket, a first arm of said bracket being a means for attaching said bracket to said shoe section of said battery housing, said arm having a slot on one side thereof, said slot being rectangular with an open end on the front edge of said arm, said arm having mounting holes on the sides of said slot, said arm fitting on said shoe section, said mounting holes fitting matching holes in said shoe section, said arm being fastened to said shoe section through said mounting holes; and a second arm of said bracket having a threaded hole therein, said hole being located at the opposite end of said bracket from said slot, said second arm having a flat headed screw member threaded through said hole, said screw being a means of securing said device to said camera, said screw having a substantial diameter circular head section, said second arm being of a narrower width than said first arm, said second arm having sides converging at the rear thereof to a base portion of said bracket, said portion joining said arms at the rear thereof, said base portion being partially cut away to allow insertion of said second arm within said camera flash mechanism mounting connector, said screw being tightened against the inside bottom surface of said connector when said second arm is inserted therein to secure said arm and thereby said device to said camera.

9. The device of claim 8 used with a camera having a tapped hole therein which functions as a tripod mount, a first arm of said U-shaped bracket being secured to said device and a second arm thereof having a screw mounted in a threaded hole therein, said screw fitting in said tapped hole and securing said second arm and therefore said device to said camera.

10. A self-powered radio transmitter device to actuate remote flash means adapted for use with a photographic camera having a shutter means and flash actuation means actuated thereby comprising, in combination:

a battery housing having a base and a cover portion constructed of a molded material, said battery housing having a shoe section on the base thereof, said shoe section having a central raised rectangular portion, said portion having a hole therein through which a wire is passed to connect said device to said camera flash actuating means, said wire having a connector on the outer end thereof, said connector mounting on a mating connector located on said camera;

a transmitter housing containing means for transmitting an actuating signal to said remote flash means, said housing being pivotally mounted about said battery housing by means of a hollow cylinder connected to said transmitter housing and passing through a side of said battery housing, said cylinder being secured within said battery housing by a fastening means, said transmitter connected to a battery and actuating means connections within said battery housing; and said shoe section of said battery housing providing mounting means for a first arm of a U-shaped connector, said second arm of said connector having a flat head screw member mounted therein, said screw member and said arm being used to mount said device on said camera.

References Cited in the file of this patent

UNITED STATES PATENTS

| | | |
|---|---|---|
| 2,272,102 | Wildman | Feb. 3, 1942 |
| 2,408,764 | Edgerton | Oct. 8, 1946 |
| 2,419,978 | Wildman | May 6, 1947 |
| 2,858,751 | Lopez | Nov. 4, 1958 |
| 2,913,971 | Berkovits | Nov. 24, 1959 |